(12) United States Patent
Sugiyama et al.

(10) Patent No.: US 8,913,308 B2
(45) Date of Patent: Dec. 16, 2014

(54) LIGHT COLLECTING MEMBER, AND OPTICAL MODULE AND IMAGE READING DEVICE HAVING THE LIGHT COLLECTING MEMBER

(71) Applicants: NEC AccessTechnica, Ltd., Shizuoka (JP); NEC Engineering, Ltd., Tokyo (JP)

(72) Inventors: Namie Sugiyama, Shizuoka (JP); Koushi Takano, Tokyo (JP); Hiroyuki Okada, Tokyo (JP)

(73) Assignees: NEC AccessTechnica, Ltd., Shizuoka (JP); NEC Engineering, Ltd., Tokyo (JP)

( * ) Notice: Subject to any disclaimer, the term of this patent is extended or adjusted under 35 U.S.C. 154(b) by 0 days.

(21) Appl. No.: 13/959,181

(22) Filed: Aug. 5, 2013

(65) Prior Publication Data

US 2014/0036324 A1    Feb. 6, 2014

(30) Foreign Application Priority Data

Aug. 3, 2012    (JP) ................. 2012-173314

(51) Int. Cl.
| | |
|---|---|
| H04N 1/04 | (2006.01) |
| H04N 1/46 | (2006.01) |
| G03F 3/08 | (2006.01) |
| G03B 27/58 | (2006.01) |
| G03B 27/52 | (2006.01) |
| G01B 11/00 | (2006.01) |
| H04N 1/00 | (2006.01) |
| G02B 7/04 | (2006.01) |
| H04N 1/03 | (2006.01) |
| H04N 1/10 | (2006.01) |

(52) U.S. Cl.
CPC ......... *H04N 1/1048* (2013.01); *H04N 1/00989* (2013.01); *G02B 7/04* (2013.01); *H04N 2201/02497* (2013.01); *H04N 1/03* (2013.01); *H04N 1/00909* (2013.01); *H04N 2201/02487* (2013.01); *H04N 2201/0081* (2013.01)
USPC ........... 358/497; 358/474; 358/484; 358/504; 358/475; 358/482; 358/518; 355/72; 355/30; 356/394

(58) Field of Classification Search
USPC ......... 358/497, 474, 484, 504, 475, 482, 518; 355/72, 30; 356/394
See application file for complete search history.

(56) References Cited

U.S. PATENT DOCUMENTS

| | | | | |
|---|---|---|---|---|
| 4,877,326 | A * | 10/1989 | Chadwick et al. | 356/394 |
| 8,625,170 | B2 * | 1/2014 | Imoto et al. | 358/474 |
| 2003/0038929 | A1 * | 2/2003 | Tokuda et al. | 355/30 |
| 2003/0117596 | A1 * | 6/2003 | Nishi | 355/51 |

FOREIGN PATENT DOCUMENTS

| | | |
|---|---|---|
| JP | 643562 A | 2/1994 |
| JP | 983736 A | 3/1997 |
| JP | 2007-300256 A | 11/2007 |

* cited by examiner

*Primary Examiner* — Charlotte M Baker
*Assistant Examiner* — Rury Grisham
(74) *Attorney, Agent, or Firm* — Sughrue Mion, PLLC

(57) ABSTRACT

A light collecting member includes a lens to make incident light be collected on a light receiving member, a lens barrel to house the lens, an end portion into which a light enters of the lens barrel being arranged near the light receiving member and a fence member to cover the end portion into which a light enters of the lens barrel and the light receiving member, the fence member having an exhaust port formed in a manner extending in a vertical direction.

8 Claims, 10 Drawing Sheets

LIGHT COLLECTING MEMBER, AND OPTICAL MODULE AND IMAGE READING DEVICE HAVING THE LIGHT COLLECTING MEMBER

This application is based upon and claims the benefit of priority from Japanese Patent Application No. 2012-173314, filed on Aug. 3, 2012, the disclosure of which is incorporated herein in its entirety by reference.

BACKGROUND OF THE INVENTION

1. Technical Field

The present invention relates to a light collecting member, and an optical module and an image reading device having the light collecting member, and, more particularly, to a light collecting member which collects light reflected from an original into a photoelectric conversion element, and an optical module and an image reading device having that.

2. Background Art

Various types of an image reading device which reads an image using a movable optical module are known. FIG. 11 is a perspective view of an ordinary image reading device. FIG. 12 is a perspective view which indicates the inside of the ordinary image reading device. As shown in FIG. 11 and FIG. 12, there is incorporated an optical module 97 in the chassis of an image reading device 99.

FIG. 13 is a perspective view of an ordinary optical module 97. The optical module 97 includes a light source 92, a plurality of mirrors 93 and a lens 91. The light source 92 applies light to an original placed on a platen of the image reading device. The plurality of mirrors 93 lead the light reflected from the original to a CCD (Charge Coupled Device: photoelectric conversion element) which is not illustrated. Meanwhile, the lens 91 is arranged between the mirrors 93 and the CCD, and the lens 91 concentrates the light reflected by the mirrors 93 and makes it form an image on the CCD.

Here, the CCD which is not illustrated is arranged in a CCD substrate 94, and the lens 91 is fixed on a lens bracket 96. The CCD substrate 94 and the lens bracket 96 are fixed on a module bracket 95 which forms the frame of the optical module 97.

A perspective view in the neighborhood of the lens 91 of the optical module 97 is shown in FIG. 14. Also, a perspective view of the lens 91 is shown in FIG. 15, and its side view is shown in FIG. 16. As shown in FIG. 15 and FIG. 16, an ordinary lens tube for the lens 91 is formed into a cylindrical shape. In FIG. 14, the lens 91 and the lens tube of the lens 91 are positioned by the CCD substrate 94 and the lens bracket 96, and further fixed by a lens holding member 98 from above. For example, a method of positioning the lens 91 and the CCD to the optical module is disclosed in patent document 1 (Japanese Patent Application Laid-Open No. 2007-300256) or patent document 2 (Japanese Patent Application Laid-Open No. 1994-43562).

In an ordinary image reading device, light emitted from a light source reflects at a surface of an original and passes the lens 91 via the mirrors 93, and is collected toward the CCD. Here, when ambient light enters a space between the lens 91 and the CCD, an image degrades. In addition, when trash and a foreign particle invade the space between the lens 91 and the CCD, a light beam emitted from the lens 91 is interrupted by the trash and the foreign particle, and an image photoelectrically converted by the CCD differs from the original.

As a method to settle the above-mentioned problem, a technology in which a closed space is formed by a lens-fixing chassis and a CCD substrate, and a lens and a CCD are arranged in the closed space is disclosed in patent document 3 (Japanese Patent Application Laid-Open No. 1997-83736), for example.

SUMMARY

An object of the present invention is to provide an image reading device and a light collecting member which can radiate heat emitted from a CCD appropriately while suppressing ambient light that comes into a space between a lens and the CCD, and invasion of trash such as dust into the space.

A light collecting member according to an exemplary aspect of the invention includes a lens to make incident light be collected on a light receiving member, a lens barrel to house the lens, an end portion into which a light enters of the lens barrel being arranged near the light receiving member and a fence member to cover the end portion into which a light enters of the lens barrel and the light receiving member, the fence member having an exhaust port formed in a manner extending in a vertical direction.

An optical module according to an exemplary aspect of the invention includes a plurality of mirrors to reflect incident light, the above-cited light collecting member to make light reflected by the mirrors be collected to a photoelectric conversion element, a substrate, on the substrate the photoelectric conversion element for converting collected light into an electric signal being fixed and a chassis, on the chassis the plurality of mirrors, the substrate and the light collecting member being positioned.

An image reading device according to an exemplary aspect of the invention includes a platen, a light source to apply light to an original placed on the platen and the above-cited optical module to convert light reflected by the original into an electric signal, the optical module being movable relative to the platen.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 1:
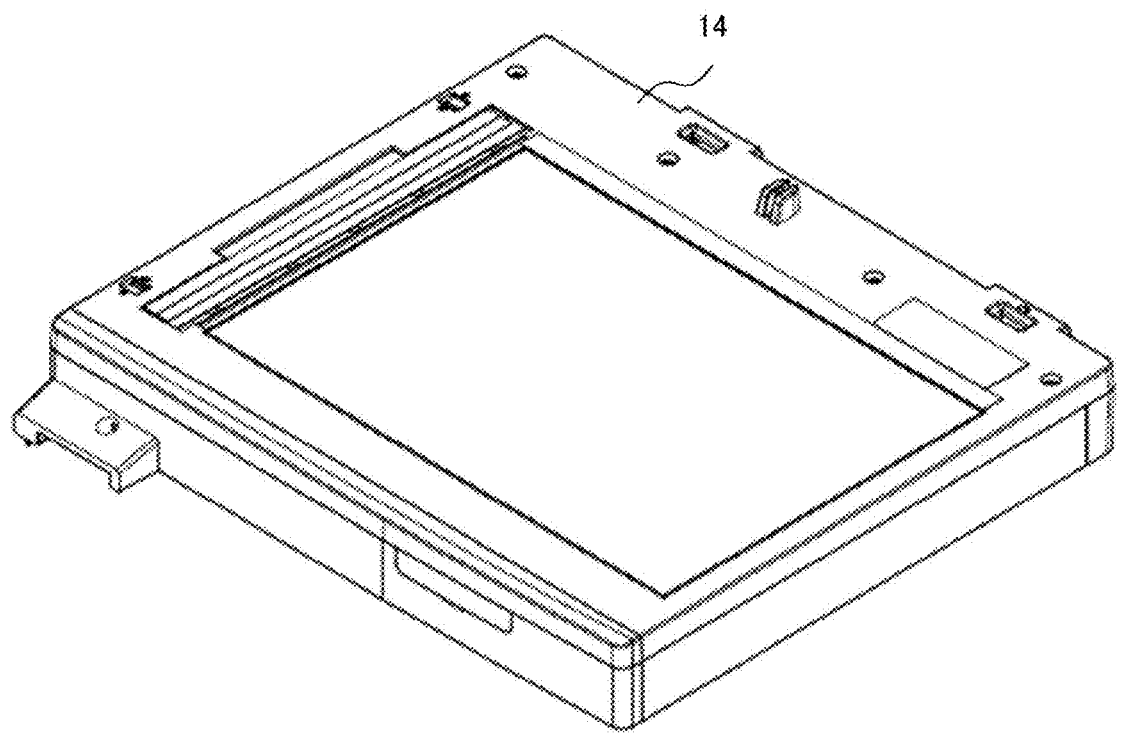
FIG. 1 is a perspective view of an image reading device 14 according to one exemplary embodiment of the present invention.
Figure 11:
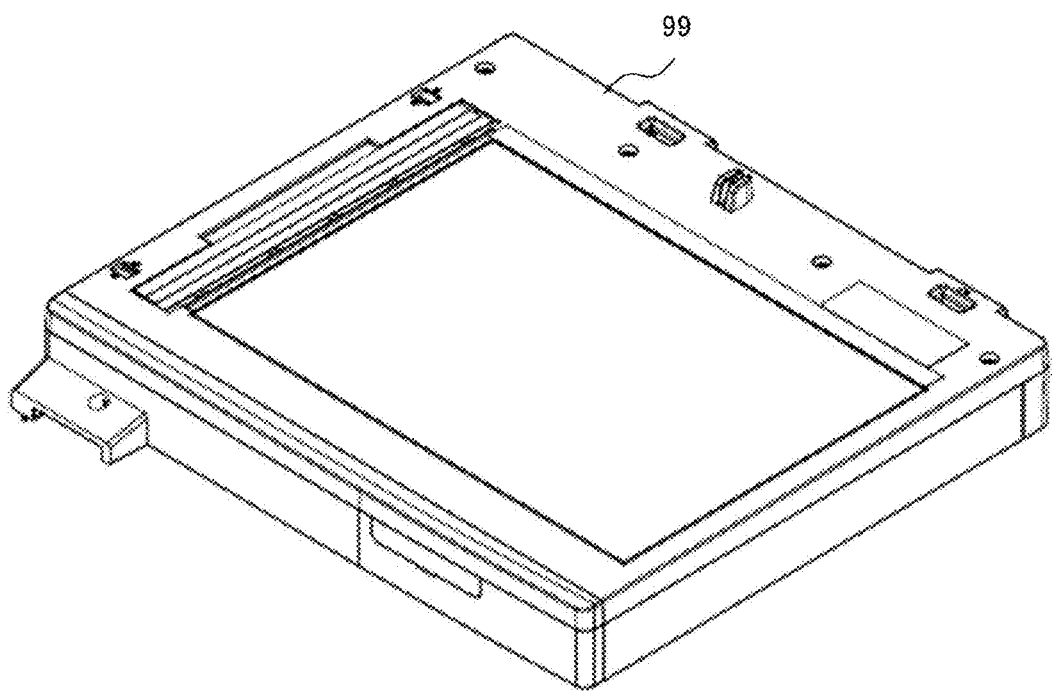
FIG. 11 is a perspective view of the ordinary image reading device 99.
Figure 12:
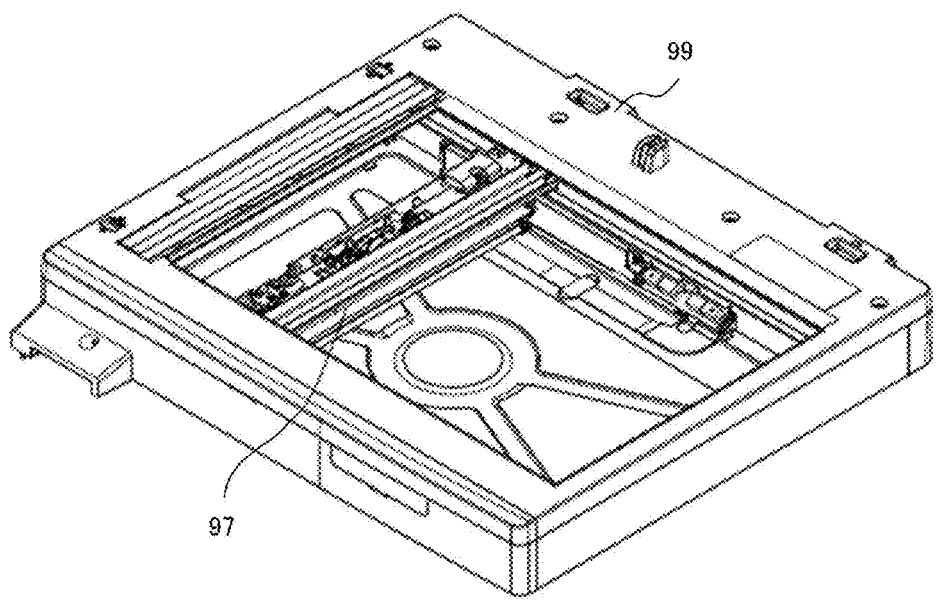
FIG. 12 is a perspective view which indicates the inside of then ordinary image reading device 99.

A perspective view of an image reading device according to an exemplary embodiment of the present invention is shown in FIG. 1. As is the case with FIG. 11 and FIG. 12 indicated in the Background Art, an optical module having a light source, a plurality of mirrors, a lens and a CCD and the like is arranged in the inside of the chassis of an image reading device 14 shown in FIG. 1 in a state being movable in a horizontal direction. For example, the image reading device 14 according to this exemplary embodiment is realized as a multifunction printer or the like.

Figure 2A:
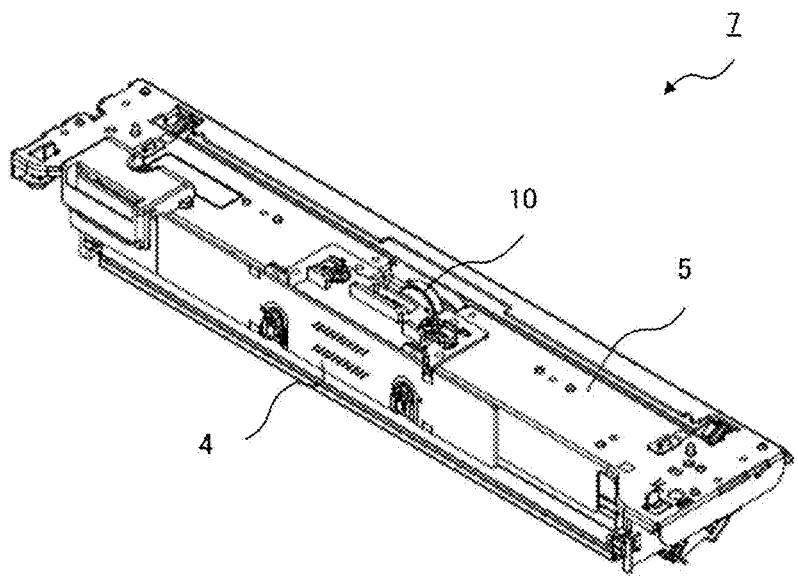
FIG. 2A is a perspective view of an optical module 7 according to one exemplary embodiment of the present invention.
Figure 2B:
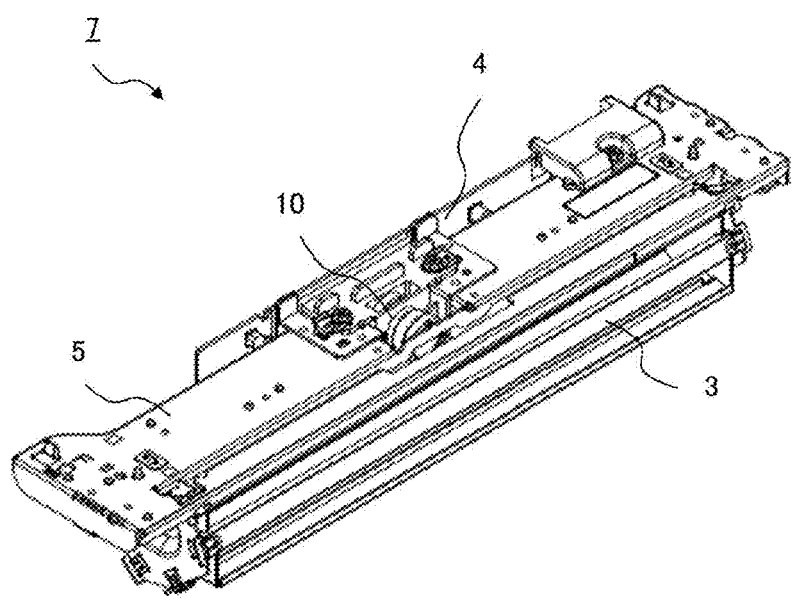
FIG. 2B is a perspective view of the optical module 7 according to one exemplary embodiment of the present invention.
Figure 13:
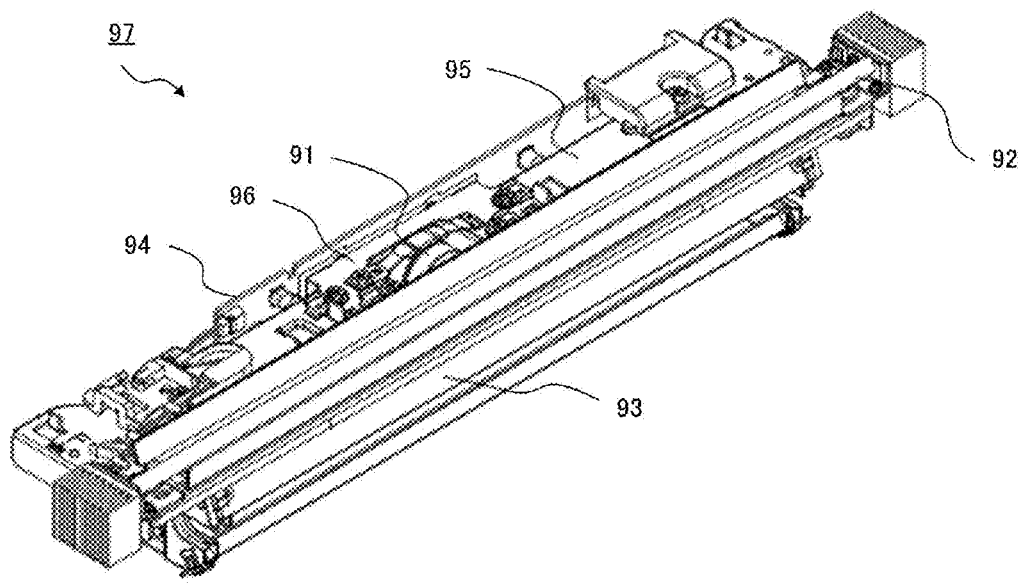
FIG. 13 is a perspective view of the ordinary optical module 97.
Figure 14:
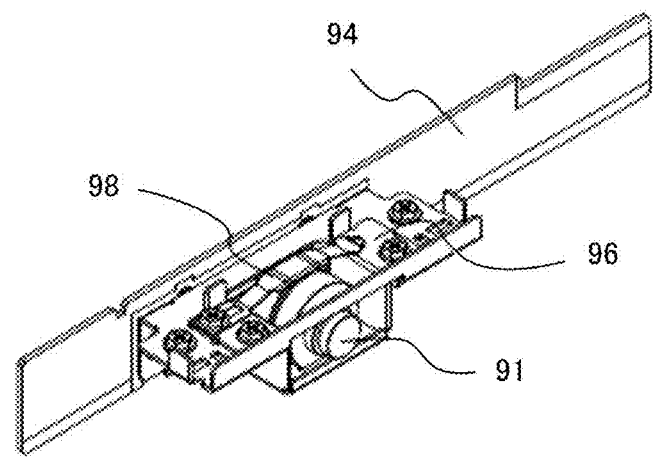
FIG. 14 is a perspective view showing a general mechanism of the neighborhood of the lens 91.
Figure 15:
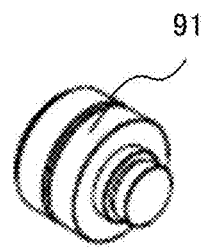
FIG. 15 is a perspective view of an ordinary lens 1.
Figure 16:
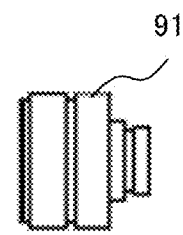
FIG. 16 is a side view of the ordinary lens 1.

A perspective view of an optical module according to this exemplary embodiment is shown in FIG. 2A and FIG. 2B. In FIG. 2A and FIG. 2B, an optical module 7 includes a plurality of mirrors 3, a light collecting member 10 having a lens 1, a CCD substrate 4 having a CCD 4a and a module bracket 5. Meanwhile, also in the image reading device 14 according to this exemplary embodiment, a light source is arranged in a position of the optical module 7 facing the mirrors 3 like the light source 92 of the optical module 97 shown in FIG. 13 of the Background Art.

The plurality of mirrors 3 lead light from the light source reflected by an original placed on a platen to the light collecting member 10 by reflecting it a plurality of times.

The light collecting member 10 is arranged between the mirrors 3 and the CCD 4a. The light collecting member 10 collects light that has been led by the mirrors 3 by the lens 1, and makes it form an image on the CCD 4a.

The CCD 4a is fixed at a position of the CCD substrate 4 opposing the lens 1, converts reflected light collected by the lens 1 into an electric signal and outputs it.

The module bracket 5 is formed by sheet metal, for example, and various members such as a light source, the plurality of mirrors 3, the light collecting member 10 and the CCD substrate 4 are arranged in the module bracket 5. By fixing the light collecting member 10 and the CCD substrate 4 on the module bracket 5 and adjusting the fore-and-aft position of the lens 1, the lens 1 arranged in the light collecting member 10 is positioned to the CCD 4a fixed on the CCD substrate 4. Description about position adjustment between the lens 1 and the CCD 4a will be made later.

Figure 3:
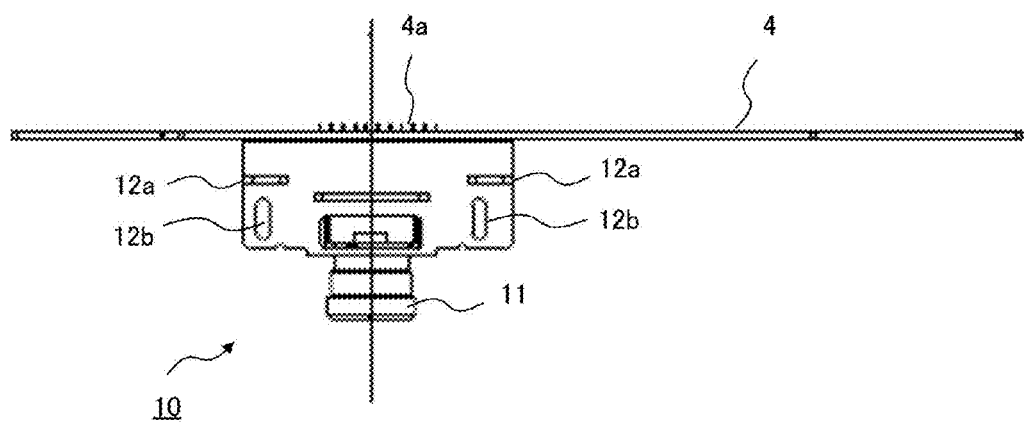
FIG. 3 is a top view of a light collecting member 10 and a CCD substrate 4 according to one exemplary embodiment of the present invention.
Figure 4:
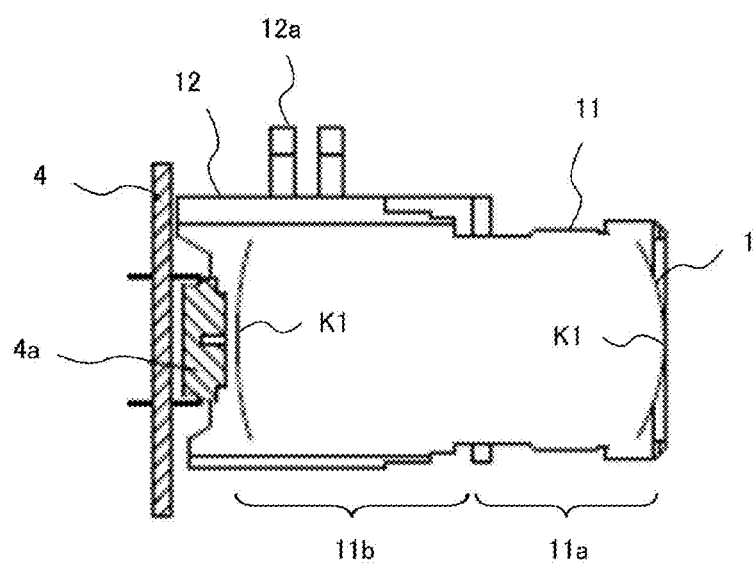
FIG. 4 is a sectional view of the light collecting member 10 and the CCD substrate 4 taken in the line A-A' of FIG. 3.
Figure 5:
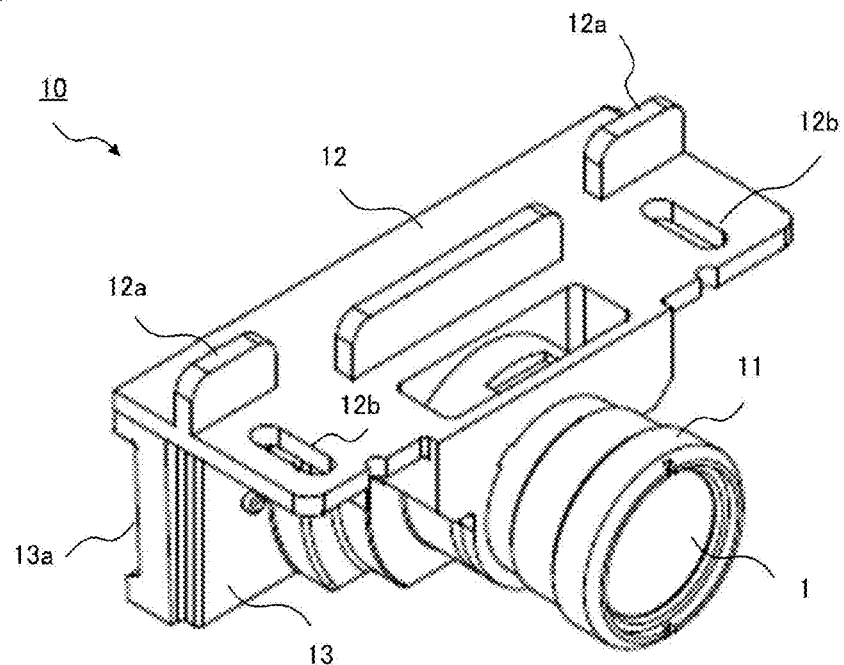
FIG. 5 is a perspective view of the light collecting member 10 according to one exemplary embodiment of the present invention.
Figure 6:
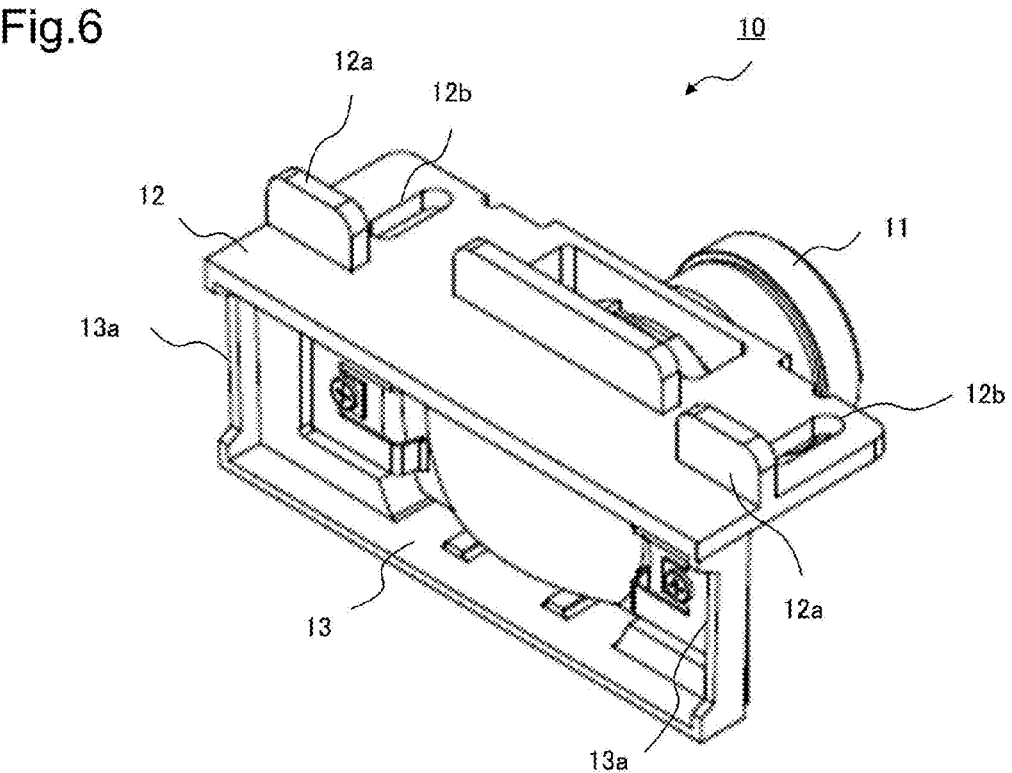
FIG. 6 is a perspective view of the light collecting member 10 according to one exemplary embodiment of the present invention.
Figure 7:
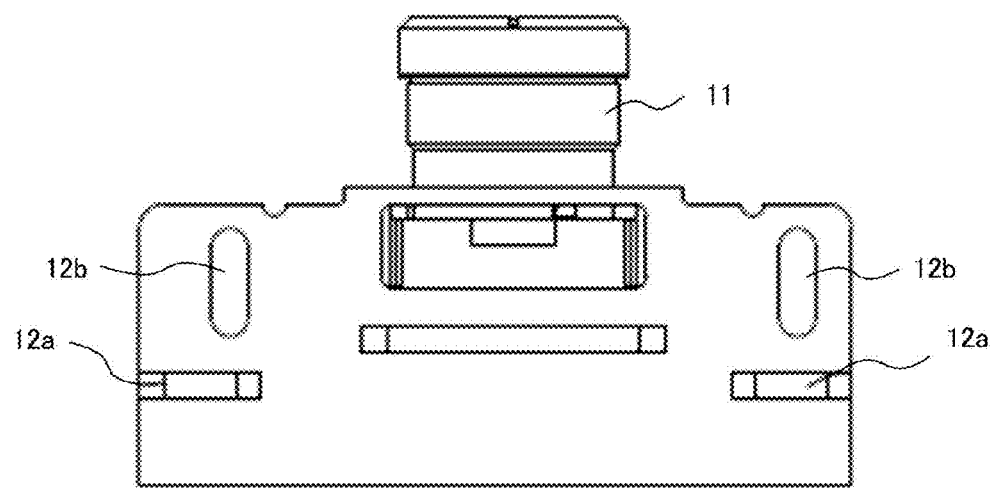
FIG. 7 is a top view of the light collecting member 10 according to one exemplary embodiment of the present invention.
Figure 8:
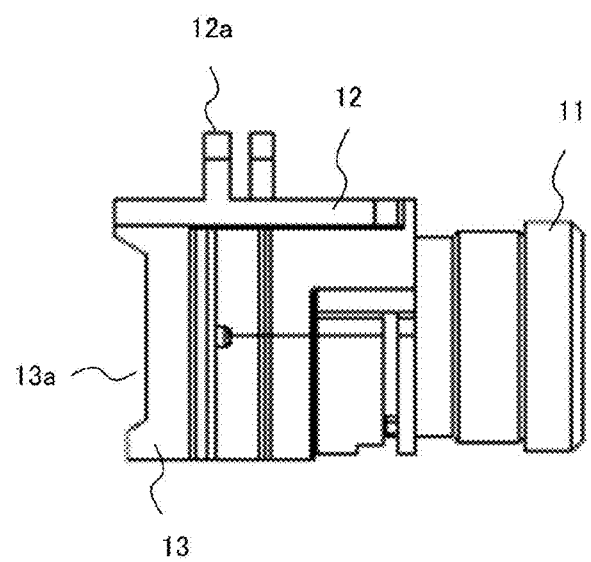
FIG. 8 is a side view of the light collecting member 10 according to one exemplary embodiment of the present invention.

The light collecting member 10 according to this exemplary embodiment will be described. A top view when combining the light collecting member 10 and the CCD substrate 4 is shown in FIG. 3, and a sectional view of the light collecting member 10 and the CCD substrate 4 taken along the line A-A' of FIG. 3 is shown in FIG. 4. Also, a perspective view of the light collecting member 10 is shown in FIG. 5 and FIG. 6, a top view thereof is shown in FIG. 7 and a side view thereof is shown in FIG. 8.

As shown in FIGS. 3 to 8, the light collecting member 10 according to this exemplary embodiment includes the lens 1, the lens barrel 11 that houses the lens 1, a flange 12 mainly used for position adjustment of the lens 1 and a fence member 13 for covering an image-forming area between the lens 1 and the CCD 4a.

In this exemplary embodiment, a compound lens is adopted as the lens 1. Positions of the both sides of the compound lens are shown by an arc k1 in FIG. 4. Reflected light led by the mirrors 3 enters the lens 1 from the right side of FIG. 4, comes out from the left side, and forms an image on the CCD 4a.

Figure 9:
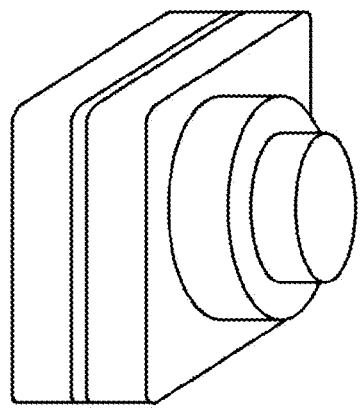
FIG. 9 is a perspective view of a lens barrel 11 according to one exemplary embodiment of the present invention.

The lens barrel 11 is a member which prevents ambient light from entering the lens 1, and the lens 1 is housed inside the lens barrel 11. A perspective view of the lens barrel 11 according to this exemplary embodiment is shown in FIG. 9. As shown in FIG. 4 and FIG. 9, a side of the lens barrel 11 where light enters is formed like a cylinder (hereinafter, it is described as a cylindrical part 11a), and a side of the lens barrel 11 from which light is emitted is formed like a rectangular parallelepiped broader than the cylindrical part 11a (hereinafter, it is described as a rectangular parallelepiped part 11b). The sizes of the cylindrical part 11a and the rectangular parallelepiped part 11b are designed so that the lens 1 can be housed inside. The flange 12 mentioned later is arranged on the upper surface of the rectangular parallelepiped part 11b.

Here, in this exemplary embodiment, the lens barrel 11 is formed by performing integral molding of the cylindrical part 11a and the rectangular parallelepiped part 11b. As a material for integral molding, resin such as polycarbonate-glass fiber (PC-GF: polycarbonate-glass fiber) 30% can be used. Further, a material used for integral molding is not limited to PC-GF30%, and, for example, resin such as PC (polycarbonate) and PC-ABS (polycarbonate-Acrylonitrile Butadiene Styrene) or a cutting material of aluminum and the like can be used. By performing integral molding of the cylindrical part 11a and the rectangular parallelepiped part 11b, increase of assembling man-hour by increase of the number of parts is suppressed, and, at the same time, invasion of ambient light and trash from the joint portion of the two members can be prevented.

Also, in this exemplary embodiment, the lens barrel 11 is formed with a length that reaches the neighborhood of the CCD 4a, and, further, is formed with a length that it does not touch the CCD 4a when moving the lens in an optical axis direction by the flange 12 mentioned later. By closely arranging the lens barrel 11 and the CCD 4a, it can be suppressed that ambient light enters an image-forming area between the lens 1 and the CCD 4a, and it can be reduced that trash enters in the image-forming area.

The flange 12 is a plain-plate body mainly used in order to adjust the distance between the lens 1 and the CCD 4a in the optical axis direction finely. The flange 12 is fixed on the upper surface of the rectangular parallelepiped part 11b of the lens barrel 11 such that, when the light collecting member 10 has been incorporated in the module bracket 5, its upper surface becomes parallel to the optical axis direction.

There are two pieces of projection 12a formed on the upper surface of the flange 12. By an assembly worker of the optical module 7 moving the flange 12 back and forth in a state that the light collecting member 10 and the CCD substrate 4 have been incorporated into the module bracket 5 while grasping the projection 12a formed onto the upper surface of the flange 12, the lens 1 moves in the optical axis direction and the focus is adjusted to the CCD 4a with a high degree of accuracy. Here, so as to make it easy for a assembly worker to grasp the projection 12a, it is preferred that its width is not less than 8 mm and its height is not less than 5 mm, and it is more desirable that the width is not less than 10 mm and the height is not less than 5 mm.

Also, in the upper surface of the flange 12, there is formed an elongated hole 12b at each of positions corresponding to the both sides of the lens. After adjusting a distance between the lens 1 and the CCD 4a using the flange 12, the flange 12 is fixed on the module bracket 5 using the elongated hole 12b formed in the upper surface of the flange 12. As can be seen from FIG. 7, the elongated hole 12b is a hole that is long in the optical axis direction of the lens 1, an ellipsoidal hole, for example. By fixing the lens 1 at a position to which the focus has been adjusted using the elongated hole 12b, the lens 1 is positioned to the CCD 4a.

In a general image reading device, adjustment for tuning the focus position between an original and the lens 1 and the CCD 4a is performed at the time of assembling before product shipment. This adjustment is performed by arranging a lens into a lens bracket, and making the lens bracket move far from or near to the face of a light receiving element. In contrast, in this exemplary embodiment, by forming the projections 12a and the elongated holes 12b in the flange 12 in an integrated manner in advance, there is no need to add a lens bracket for focus adjustment separately.

Next, the fence member 13 is a member of a rectangular parallelepiped shape having one face opened. The CCD substrate 4 onto which the CCD 4a is fixed is arranged in the aperture plane side, and the CCD 4a is arranged inside the fence member 13. On the other hand, the lens barrel 11 is fixed with screws on a face facing the CCD substrate 4 in an inserted state. That is, by incorporating the light collecting member 10 and the CCD substrate 4 into the module bracket 5, the emission side of the lens barrel 11 and the CCD 4a are arranged oppositely in the fence member 13. By arranging the emission side of the lens barrel 11 and the CCD 4a oppositely in the fence member 13, entering of ambient light to the optic axis can be reduced, and invasion of foreign particles into a space in which the CCD 4a has been arranged can be also reduced.

By the way, the CCD 4a generates heat by keeping driving for a long time. In a case where the CCD 4a is arranged inside the fence member 13 for shading and prevention of invading trash, temperature in the fence member 13 rises due to heat generation by the CCD 4a. For example, when the lens barrel 11 is formed by a resin material which is susceptible to influence of heat, the lens barrel 11 expands and shrinks repeatedly along with a temperature change in the fence member 13, causing deformation of the lens barrel 11. In this case, the distance between the lens 1 and the CCD 4a changes, and thus the focus adjustment between the lens 1 and the CCD 4a degrades.

Accordingly, in the fence member 13 according to this exemplary embodiment, a notch 13a having the depths equal to the height of the CCD 4a is formed into each of the two side faces that extend in the vertical direction when the light collecting member 10 is incorporated in the optical module 7. By forming the notch 13a in each of the side faces of the fence member 13, heat which has occurred from the CCD 4a can be released from the notch 13a to an outer space, and rise of temperature around the CCD 4a can be suppressed.

Figure 10:
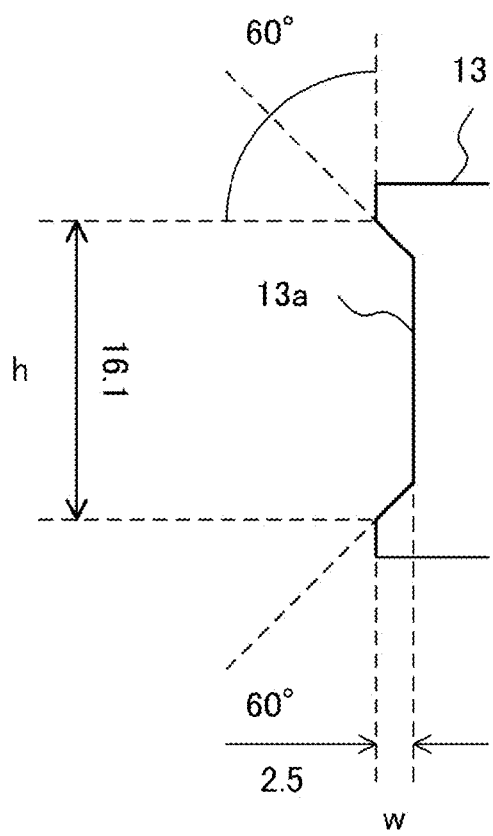
FIG. 10 is a diagram illustrating the shape of a notch 13a according to one exemplary embodiment of the present invention.

An example of the notch 13a is shown in FIG. 10. In FIG. 10, the notch 13a is designed such that the height is 2.5 mm, the notch length 16.1 mm and the opening angle of a side face 60 degrees. Here, generally, ambient light and trash is incident and enters from the upper side of the optical module 7. Accordingly, in the fence member 13 according to this exemplary embodiment, by not forming the notch 13a in positions located above and below when the light collecting member 10 is incorporated in the optical module 7, but forming the notch 13a in the side faces, heat emitted from the CCD 4a can released outside efficiently while suppressing invasion of ambient light and trash from the notch 13a.

Meanwhile, the notch 13a corresponds to an exhaust port in the claims. The notch 13a is not limited to the shape of FIG. 10, and should simply be an exhaust port extending in the vertical direction when the light collecting member 10 is incorporated in the optical module 7.

Although the lens barrel 11, the flange 12 and the fence member 13 are combined after having forming these as separate bodies respectively in this exemplary embodiment mentioned above, two or three of these can be molded integrally.

As mentioned above, in the optical module 7 according to this exemplary embodiment, the lens barrel 11 formed by performing integral molding of the cylindrical part 11a and the rectangular parallelepiped part 11b is formed with a length that reaches the neighborhood of the CCD 4a, and, further, the fence member 13 that covers the emission side of the lens barrel 11 and the CCD 4a and the flange 12 for moving the lens 1 in the optical axis direction are arranged to the lens barrel 11.

By performing integral molding of the cylindrical part 11a and the rectangular parallelepiped part 11b, increase of the assembling man-hour due to increase of the number of components is suppressed, and invasion of ambient light and trash from the joint portion of the two members can be prevented.

By performing adjacent arrangement of the emission side of the lens barrel 11 and the CCD 4a and covering these with the fence member 13, an image-forming area between the lens 1 and the CCD 4a is sheltered from the outer space, and thus entering of ambient light to the optic axis and invasion of trash into the neighborhood of the CCD 4a can be prevented.

Also, when an assembly worker of the optical module 7 adjusts the focus of the lens 1 by moving the lens 1 in the optical axis direction while grasping the projection 12a of the flange 12, and fixes the lens 1 at the adjusted position using the elongated hole 12b of the flange 12, focus adjustment can be performed with a high degree of accuracy after having incorporated the light collecting member 10 into the module bracket 5.

In addition, in the optical module 7 according to this exemplary embodiment, the notch 13a is formed in each of the side faces of the fence member 13. In this case, heat emitted from the CCD 4a can be released effectively while suppressing invasion of ambient light and trash from the notch 13a, and thus rise of temperature in the neighborhood of the CCD 4a can be suppressed.

Here, when arranging a lens and a CCD in a closed space by applying the technology in patent document 3 described in the background art, positions of the lens and the CCD cannot be adjusted finely. Further, when a lens and a CCD are arranged in a closed space, temperature in the closed space changes greatly by emitted heat from the CCD, and a positional relationship between the lens and the CCD changes.

In contrast, in an optical module according to the present invention, a flange for moving the lens to the optical axis direction is arranged to a lens barrel. Accordingly, a position of the lens and the CCD can be adjusted finely after having incorporated a light collecting member into a module bracket.

Yet further, in an optical module according to the present invention, a notch is formed in the side faces of a fence member which covers the emission side of the lens barrel and the CCD. Accordingly, heat emitted from the CCD can be released from the notch, and thus rise of temperature in the neighborhood of the CCD can be suppressed.

Accordingly, an optical module according to the present invention can position a lens with a high degree of accuracy relative to a CCD while suppressing incidence of ambient light and invasion of trash such as dust, and, in addition, can suppress a change of a positional relationship between the lens and the CCD due to temperature rise around the CCD.

Meanwhile, an optical module according to the present invention is suitably applied to various image reading devices that use a photoelectric conversion element.

The whole or part of the exemplary embodiments disclosed above can be described as, but not limited to, the following supplementary notes.

(Supplementary note 1) An image reading device, comprising: a photoelectric conversion element fixed on a substrate and a light collecting member including a lens to make light entered from outside be collected to the photoelectric conversion element; the light collecting member including a lens barrel to shelter a space between the lens and the photoelectric conversion element from outside; the lens barrel being formed by integral molding of a member formed approximately cylindrically in an incident side of the lens and a member of a square fence shape opened in a size wider than an outline of the photoelectric conversion element in an emission side of the lens with resin as a material, and being arranged so as to cover the photoelectric conversion element with the square-fence-shaped fence; and both opposed side faces of a vertical direction of the square-fence-shaped fence being formed into a concave shape so as to form an opening between the fence and a substrate fixing the photoelectric conversion element.

(Supplementary note 2) The image reading device according to Supplementary note 1, wherein, in an upper surface side of the lens barrel, a flange formed in an approximately planar manner is formed, and wherein, on a surface of the flange formed in an approximately planar manner, elongated holes of an ellipsoid-like shape taking an optical axis direction of the lens as a long axis are provided in positions corresponding to both ends of the lens, respectively.

(Supplementary note 3) The image reading device according to Supplementary note 1, wherein projections of a direction vertical to a surface of the flange are provided in both ends of an upper surface of the flange, respectively.

(Supplementary note 4) The image reading device according to Supplementary note 1, wherein the lens barrel is formed so as to make a part of the approximately cylindrical member formed in an incident side of the lens extend to an emission side of the lens.

(Supplementary note 5) A light collecting member, comprising: a lens to make light incident from outside be collected to a photoelectric conversion element fixed on a substrate; a lens barrel to shelter a space between the lens and the photoelectric conversion element from outside; the lens barrel being formed by integral molding of a member formed approximately cylindrically in an incident side of the lens and a member of a square fence shape opened in a size wider than an outline of the photoelectric conversion element in an emission side of the lens with resin as a material, and being arranged so as to cover the photoelectric conversion element with the square-fence-shaped fence; and both opposed side faces of a vertical direction of the square-fence-shaped fence being formed into a concave shape so as to form an opening between the fence and a substrate fixing the photoelectric conversion element.

(Supplementary note 6) The light collecting member according to Supplementary note 5, wherein, in an upper surface side of the lens barrel, a flange formed into an approximately planar shape is formed, and wherein, on a surface of the flange formed into an approximately planar shape, elongated holes of an ellipsoid-like shape taking an optical axis direction of the lens as a long axis are provided in positions corresponding to both ends of the lens, respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A light collecting member, comprising:
    a lens to make incident light be collected on a light receiving member;
    a lens barrel to house said lens, an end portion into which a light enters of said lens barrel being arranged near said light receiving member; and
    a fence member to cover said end portion into which a light enters of said lens barrel and said light receiving member, said fence member having an exhaust port formed in a manner extending in a vertical direction.

2. The light collecting member according to claim 1, further comprising:
    a flange connected to said lens barrel, said flange having a projection for moving said lens in an optical axis direction and an elongated hole extending in said optical axis direction.

3. The light collecting member according to claim 2, wherein said lens barrel is formed by performing integral molding of a cylindrical part arranged in a light incident side and a rectangular parallelepiped part arranged in a light collecting side, and
    wherein said flange is fixed on an upper surface of said rectangular parallelepiped part.

4. The light collecting member according to claim 3, wherein said cylindrical part and said rectangular parallelepiped part are molded integrally by resin.

5. The light collecting member according to claim 2, wherein said lens barrel is formed to have a length not to touch said light receiving member, upon said lens being moved in an optical axis direction.

6. The light collecting member according to claim 1, wherein said light receiving member is a photoelectric conversion element.

7. An optical module, comprising:
    a plurality of mirrors to reflect incident light;
    a light collecting member according to claim 1 to make light reflected by said mirrors be collected to a photoelectric conversion element;
    a substrate, on said substrate said photoelectric conversion element for converting collected light into an electric signal being fixed; and
    a chassis, on said chassis said plurality of mirrors, said substrate and said light collecting member being positioned.

8. An image reading device, comprising:
a platen;
a light source to apply light to an original placed on said platen; and
an optical module according to claim 7 to convert light reflected by said original into an electric signal, said optical module being movable relative to said platen.

* * * * *